W. H. RINEBOLD.
LICENSE PLATE HOLDER.
APPLICATION FILED APR. 8, 1922.
1,436,358.
Patented Nov. 21, 1922.
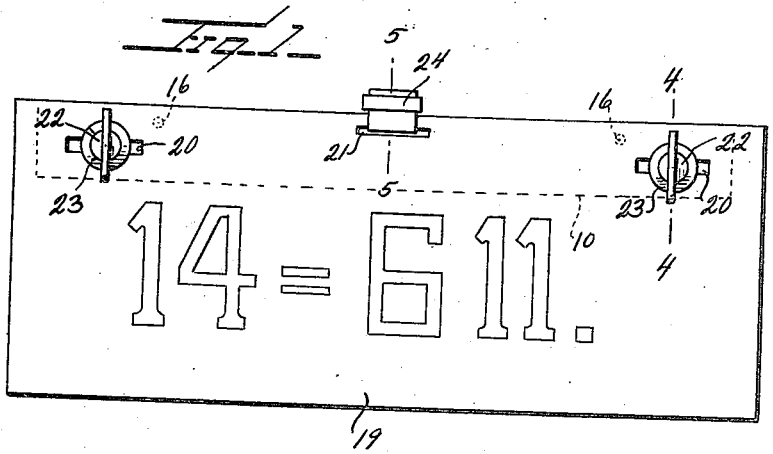
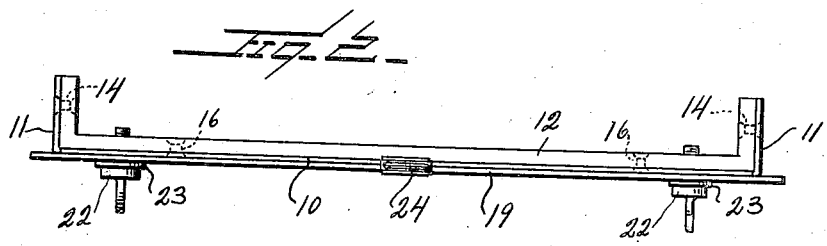
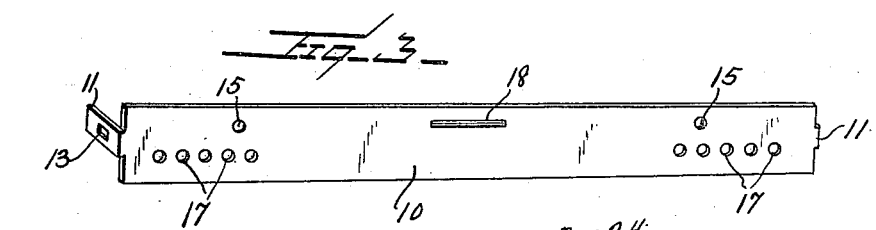
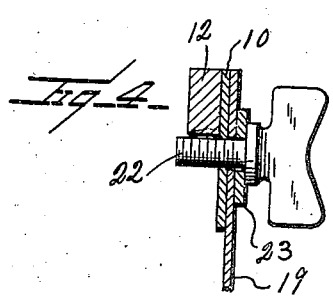
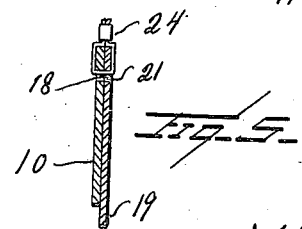
Inventor
W. H. Rinebold
By Watson E. Coleman
Attorney Patented Nov. 21, 1922.

1,436,358

UNITED STATES PATENT OFFICE.

WILBERT H. RINEBOLD, OF FOSTORIA, OHIO.

LICENSE-PLATE HOLDER.

Application filed April 8, 1922. Serial No. 550,732.

*To all whom it may concern:*

Be it known that I, WILBERT H. RINEBOLD, a citizen of the United States, residing at Fostoria, in the county of Seneca and State of Ohio, have invented certain new and useful Improvements in License-Plate Holders, of which the following is a specification, reference being had to the accompanying drawings.

This invention relates to improvements in license plate holders, and more particularly to a device for attaching the license plate of an automobile to the vehicle.

An important object of the invention is to provide a device of this character so constructed that the license tag may be attached in a manner preventing its unauthorized removal.

A further object of the invention is to provide a device of this character which is permanently attached to the vehicle and which when the license plate is in position thereon, has certain of its securing elements covered by the license plate whereby to prevent their removal without prior removal of the license plate together with means for attaching the license plate thereto in a manner preventing its unauthorized removal.

A still further object of the invention is to provide a device of this character whereby the authorized removal of the license plate from the holder is rendered a very simple operation.

These and other objects I attain by the construction and arrangement shown in the accompanying drawings wherein for the purpose of illustration is shown a preferred embodiment of the invention and wherein like reference characters designate like parts throughout.

In the drawings:

Figure 1 is a rear elevation showing a license tag attached to a bracket constructed in accordance with my invention;

Figure 2 is a plan view thereof;

Figure 3 is a perspective of the attaching bracket detached;

Figure 4 is a section on the line 4—4 of Figure 1; and

Figure 5 is a section on the line 5—5 of Figure 1.

Referring now more particularly to the drawings, the numeral 10 indicates an elongated plate provided at the ends thereof with ears 11, the material of the plate preferably being flexible so that the ears 11 may be flexed as shown in Figure 2 to conform to the shape of the portion 12 of the vehicle to which the bracket or plate 10 is being attached. The ears 11 are apertured, as at 13, for the reception of securing elements 14 extending through the ears and through the portion 12 of the vehicle, these attaching elements preferably being of the unremovable order, such as rivets or the like. The plate 10 is further provided through the face thereof with openings 15 adapted for the reception of securing elements 16 extending through the portion 12 of the vehicle.

Adjacent each end of the plate a series of longitudinally spaced openings 17 is provided, these openings being screw threaded, and centrally of the plate an opening 18 is formed. The license plate 19 has formed therein openings 20 adjacent the ends thereof, and a central opening 21. The openings 20 are adapted to permit the passage of the stems of thumb screws 22 for engagement in one of the series of openings 17, a lock washer 23 being disposed between the plate 19 and the head of the thumb screw 22 so as to prevent rotation thereof. Through the openings 21 of the plate and 18 of the bracket 10 a securing device 24 is extended for preventing unauthorized removal of the plate 19 from the bracket 10. This may consist of a lock or of a seal of a state, county or association as desired.

It is to be noted that the construction of the plate is such that when the plate is in applied position the securing elements 16 of the bracket are covered by the plate and accordingly their removal is prevented until the plate is removed. Such removal is, of course, impossible until the securing element 24 is removed and this may not be done except by an authorized person without leaving the license plate in a condition showing that it has been tampered with. It will be seen that with a construction of this character the removal of a license plate from a car and its transfer to another car will be rendered impossible without evidence remaining of the removal. It will furthermore be obvious that an authorized person can readily remove the securing member 24 and that the plate may be readily removed from the bracket 10 by removing the thumb screws.

From the foregoing it is believed to be obvious that a lincense plate holder constructed in accordance with my invention is particularly well adapted for the purpose for which it is intended by reason of the fact that it prevents unauthorized removal of the license plate or of the license plate bracket simultaneously. It will furthermore be obvious that the construction as hereinbefore set forth is capable of some change and modification without materially departing from the spirit of my invention and I accordingly do not limit myself thereto except as hereinafter claimed.

I claim:

1. In a license plate holder, a plate provided with openings for the reception of securing elements whereby it may be permanently attached to a vehicle and with other openings whereby a license plate may be secured thereto, said license plate when in applied position covering certain of the securing elements of the holder to prevent removal thereof, said bracket being further provided with an opening coacting with an opening formed in the license plate for the reception of a securing element preventing unauthorized removal of the license plate from the bracket.

2. In a device of the type described, an elongated plate provided at its end with ears, openings for the reception of securing elements formed in the plate and in the ears, threaded openings formed in the plate adjacent each end thereof and adapted for the reception of securing elements extending through the license plate, said plate having a further opening adapted for coaction with an opening formed in the license plate for the reception of a securing element preventing unauthorized removal of the license plate from the first named plate.

In testimony whereof I hereunto affix my signature.

WILBERT H. RINEBOLD.